United States Patent
Scoccia

[19]
[11] Patent Number: 6,015,340
[45] Date of Patent: Jan. 18, 2000

[54] METHOD FOR ASSEMBLING SHAFT OF ROTATING VALVE DOOR BETWEEN A PAIR OF HOUSINGS

[75] Inventor: Ardeean Scoccia, Amherst, N.Y.

[73] Assignee: General Motors Corporation, Detroit, Mich.

[21] Appl. No.: 08/992,680

[22] Filed: Dec. 17, 1997

[51] Int. Cl.[7] ............................................. B60H 1/24
[52] U.S. Cl. ........................... 454/69; 137/15; 251/305; 251/367
[58] Field of Search ............... 137/15, 315; 251/305, 251/367; 454/69

[56] References Cited

U.S. PATENT DOCUMENTS 5,252,084  10/1993  Wakata et al. ........................ 439/157

Primary Examiner—Harold Joyce
Attorney, Agent, or Firm—Patrick M. Griffin

[57] ABSTRACT

The cylindrical end of the shaft of a rotating valve door in an automotive HVAC case is closely supported without either excessive clearance or binding, accommodating expected tolerance variations in the final, assembled location of the shaft end. The expected tolerance range is divided up into components along, and perpendicular to, the direction in which two housings of the case are assembled. One slot is cut into one housing along the direction of assembly, and another perpendicular thereto. When the housings are assembled, the two slots cross one another, capturing the shaft end closely on all four sides between the two pairs of slots. The closed ends of the slots have enough clearance from the nominal location of the shaft end to let the shaft end float to its final location without binding.

1 Claim, 4 Drawing Sheets

METHOD FOR ASSEMBLING SHAFT OF ROTATING VALVE DOOR BETWEEN A PAIR OF HOUSINGS

TECHNICAL FIELD

This invention relates to vehicle heating and air conditioning cases in general, and specifically to an improved method for capturing and retaining the rotatable shaft of a flapper door type valve between the abutted edges of a pair of case housings.

BACKGROUND OF THE INVENTION

Automotive air conditioning systems typically use a so called HVAC case, which is basically a large, molded plastic box within which the heater core, evaporator core, and various flapper type doors are contained. The doors have rotating shafts that are captured between a pair of abutted housings that are assembled together to complete the case. In order to rotate freely, but without rattle, the cylindrical end portions of the shaft must be closely, but not tightly, captured between the housings. Conventionally, one half of the circumference of the shaft end is cradled in a close fitting notch formed in one housing, and the other half of its circumference is held down against the closed end of the notch by a blade carried by the other housing. Ideally, the blade holds the shaft end down in the notch closely, but not tightly. Because of tolerance variations inherent in both the manufacture and assembly of the two housings, which have inherent flex and bow, the blade and the closed end of the notch may either leave a clearance around the circumference of the shaft end, or close on it tightly. Clearance leads to rattle and noise, and too tight a fit may lead to binding.

SUMMARY OF THE INVENTION

The invention provides a method for retaining the cylindrical end of a valve's rotating shaft that compensates for such tolerance variations, and which closely confines the end of the shaft without either excessive clearance or binding.

In the preferred embodiment of the method disclosed, a nominal or ideal final location for the circumference of the cylindrical shaft end is determined, relative to the abutted edges of the two housings that make up the case. The two housings are assembled by pushing their edges into abutment in a known, straight line direction, a direction that constitutes the reference frame for determining the location of other structural features. When the housings are assembled together, any structure on the housing that contains and captures the circumference of the end of the shaft determines its final assembled location. Therefore, knowing the expected tolerance inherent in the manufacture and assembly of the housings themselves, the equivalent tolerance range in the nominal assembled location of the end of the shaft can be determined as well, both along, and perpendicularly to, the reference frame direction of housing assembly.

Knowing this expected tolerance range in the final nominal location of the shaft end, those structural features of the housing intended to capture and contain it are designed accordingly. Specifically, a first capture slot is provided in one of the housings that is oriented perpendicularly to the assembly direction reference line. The first capture slot has an open end on one side, a closed end on the other, and a pair of straight edges spaced apart by the shaft end diameter, and at least as long as the expected tolerance range in the direction of the first slot. The closed end of the first capture slot, however, is not located directly on the shaft end nominal location. Instead, it has a clearance therefrom at least equal to half the expected tolerance range. Likewise, a second capture slot is on the other of the housings, but oriented along the direction of assembly. The second capture slot has an open end facing away from its respective housing edge, a closed end, and a pair of straight edges, also separated by the shaft end diameter and also at least as long as the expected tolerance range in the second slot's direction. Likewise, its closed end has the same clearance relative to the nominal location of the circumference of the shaft end.

Before assembling the housings, the end of the shaft is inserted into the first capture slot. When the housings are assembled, the second capture slot moves over the end of the shaft and the two slots cross and overlap. The circumference of the shaft is closely contacted, tangentially, by the four slot edges at two pairs of diametrically opposed points. There are four directions in which the circumference of the cylindrical shaft end can move away from its nominal location, all of which are accommodated by the slots. Therefore, the shaft end is always closely contained, without clearance or binding.

BRIEF DESCRIPTION OF THE DRAWINGS

These and other features of the invention will appear from the following written description, and from the drawings, in which.

DESCRIPTION OF THE PREFERRED EMBODIMENT

Figure 1:
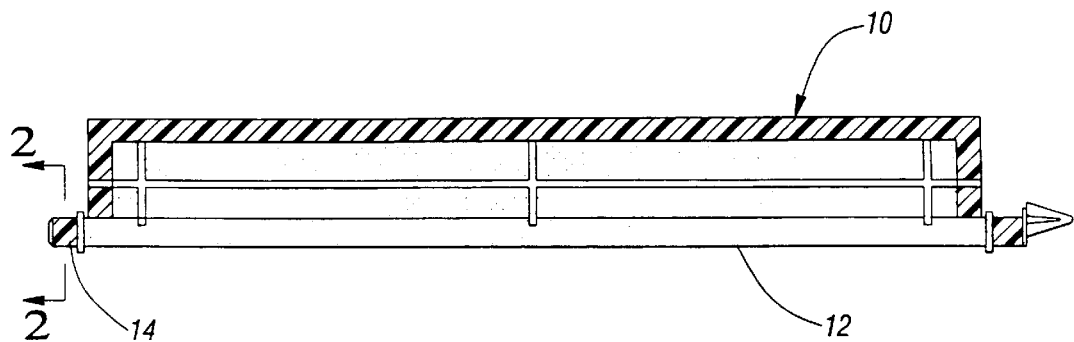
FIG. 1 is a plan view of a flapper type valve.
Figure 2:
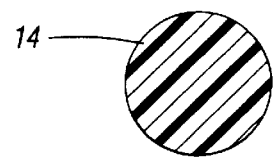
FIG. 2 is a cross section through an end of the shaft.
Figure 3:
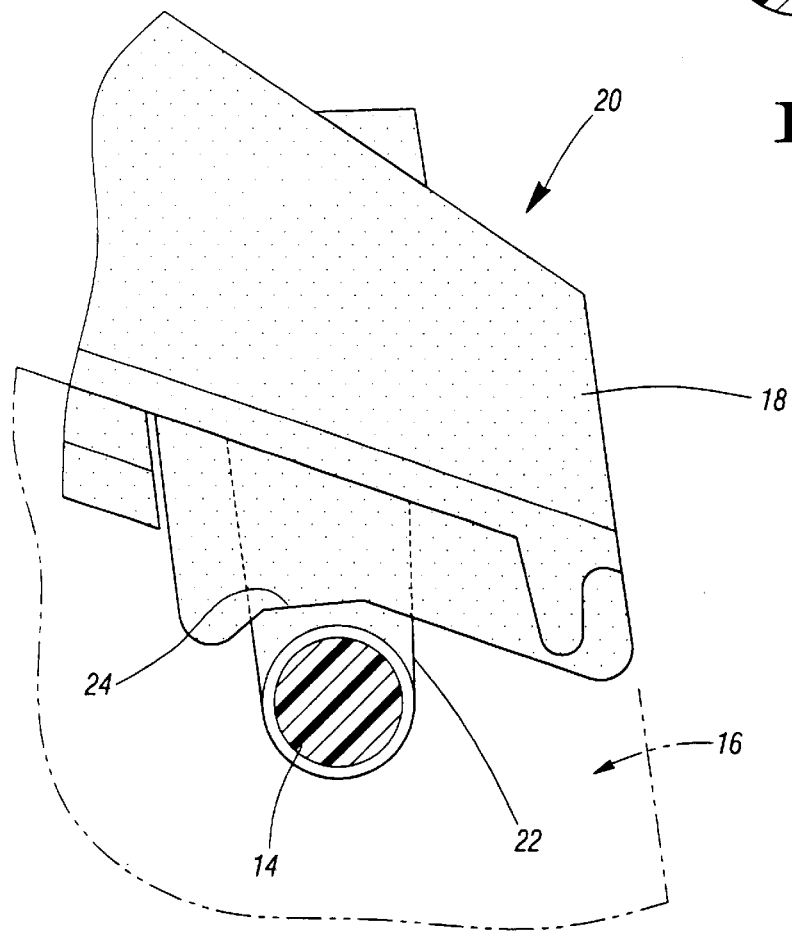
FIG. 3 is an end view of the valve shaft as retained in a prior art case.

Referring first to FIGS. 1, 2 and 3, a flapper type valve door, indicated generally at 10, has a rotating shaft 12 with at least one cylindrical end 14 that supports the shaft 12 for rotation back and forth. Here, the shaft 12 has two such ends, but the first end is installed simply by insertion in a close fitting round hole, and all of the tolerance being taken up in the second end 14, which is installed last. Conventionally, as seen in FIG. 3, the case would be comprised of two main halves or housings, a first housing indicated generally at 16 and a second housing 18. Each housing 16 and 18 is a hollow, molded plastic, open sided box, which are abutted at matching edges to make a larger, complete case, indicated generally at 20. Case 20, in turn, would contain all the typical HVAC components, including heat exchanger cores and the various valves, like door 10, that rotate back and forth to selectively direct air flow. The "lower" (from the perspective of the drawing) housing 16 contains a closed ended straight slot 22 that cradles the lower half of the circumference of the cylindrical shaft end 14, which is inserted before the "upper" housing 18 is installed. The upper housing 18 has a downwardly projecting blade 24 which, when the upper housing 18 is installed to the lower housing 16, slides down and over the upper half of the shaft end 14. The shaft end 14 is thus contained and captured for rotation back and forth. However, as can be clearly seen, there is a clearance of the edge of blade 24 above the shaft end 14, deliberately so, to accommodate a situation in which accumulated tolerances bring the blade 24 into close engagement with the upper surface of the shaft end 14. Otherwise, the shaft end 14 could bind, retarding its free rotation, or even preventing tight closing of the housings 16 and 18 to one another. However, the clearance inevitably allows some rattle of the shaft 12 as it rotates, which can cause noise, even though the operation of valve 10 would not be particularly affected. The subject invention obviates the need for this compromise.

Figure 4:
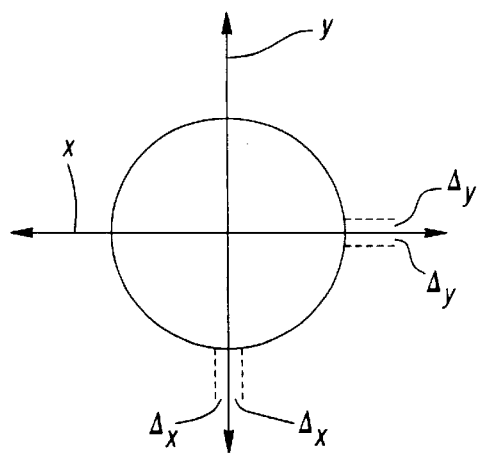
FIG. 4 is schematic view of the circumference of the cylindrical end of the shaft in a nominal final assembly position, showing the tolerance range.

Referring next to FIG. 4, the basic problem faced in closely capturing and confining the circumference of the shaft end 14 is illustrated. As a convenient reference frame, line Y indicates the direction along which the housings 16 and 18 would be moved into abutment, and line X is perpendicular thereto. The nominal, ideal final assembly location of the circumference of shaft end 14 is shown in dotted lines, centered at the intersection of lines X and Y. Any structure that is integral to housings like 16 and 18, which are large and partially flexible, will inevitably have a tolerance range in its final assembly location. This tolerance can be resolved into components along the X and Y lines, to either side of the ideal center location, indicated at Δ X and Δ Y respectively. Since it is some structural part of the housings 16 and 18 that will determine the final location of the shaft end 14, those tolerances can just as easily be conceptualized as a tolerance range in the final assembled location of the shaft end 14 per se, rather than of the shaft end locating structures themselves. The end result is the same, but the first principles at work should be kept in mind. The invention provides structures integral to the housings 16 and 18 that can be said to accommodate that tolerance range of shaft end 14, although, in a real sense, they actually cause it. However conceptualized, the designer can, knowing the manufacturing parameters of the housings 16 and 18, determine the tolerance range as indicated in FIG. 4, and then use it to locate the structural features described next.

Figure 5:
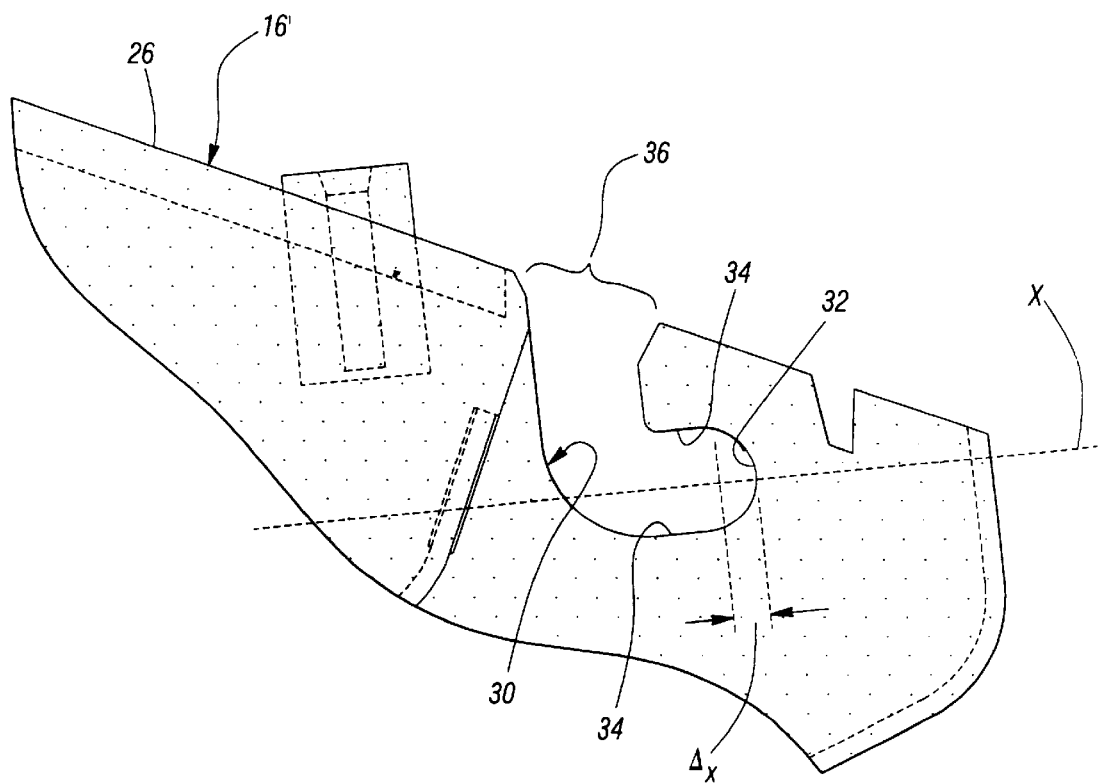
FIG. 5 is a side view of the first capture slot.
Figure 6:
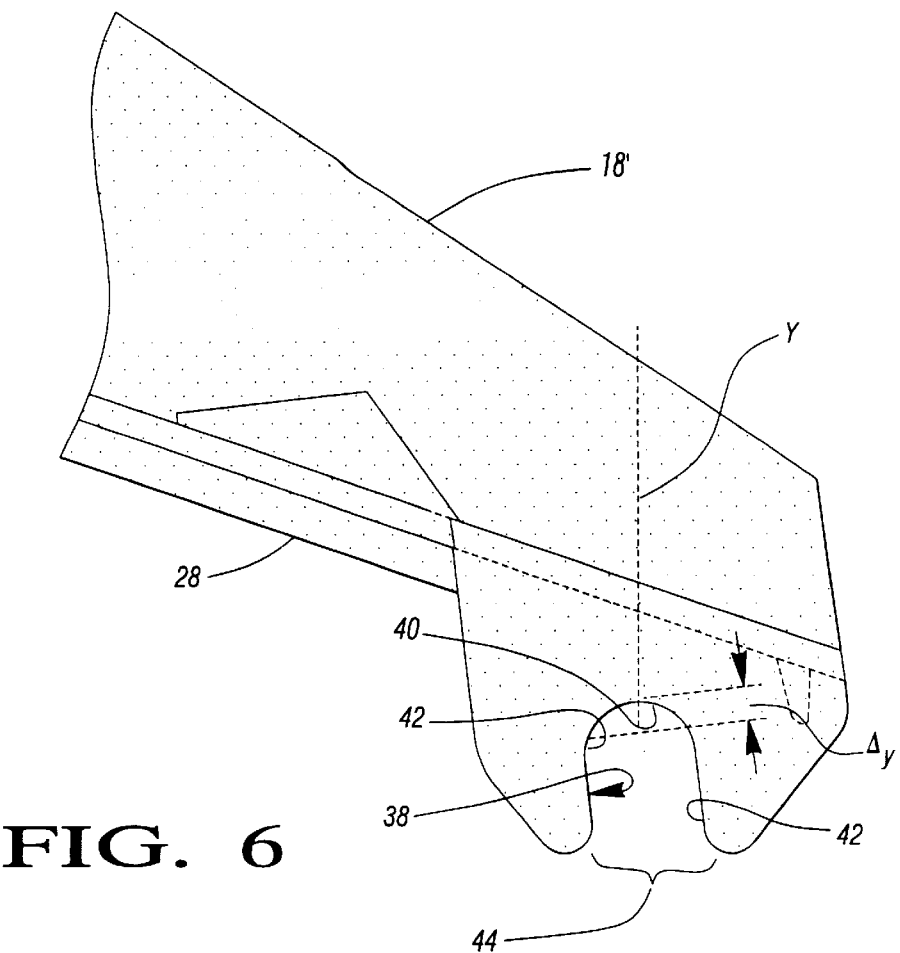
FIG. 6 is a side view of the second capture slot.

Referring next to FIGS. 5 and 6, the structure that captures and contains the shaft end 14 is described. A pair of housings is essentially identical to those described above, and indicated at 16' and 18' respectively. These have edges 26 and 28 respectively which move into abutment along the assembly direction defined above, along the line Y. As seen in FIG. 5, a first capture slot, indicated generally at 30, is cut through the housing edge 26. First slot 30 is comprised of a closed end 32, a pair of parallel straight edges 34, and an open end 36. The straight edges 34 are spaced apart to match the diameter of shaft end 14, centered on the line X defined above, and are at least as long as the diameter of the shaft end 14. Open end 36 is flared wider than the diameter of the shaft end 14 and extends parallel to the line Y opening through the edge 26 in a basic L shape. The closed end 32 is semi circular, but not because of any intent that the circumference of shaft end 14 ever be directly journaled against it, as with the conventional straight slot 22 described above. Instead, the first slot closed end 32 is located so as to have a clearance of at least Δ X away from the nominal location of the circumference of shaft end 14, or half the total tolerance range. As seen in FIG. 6, a second capture slot, indicated generally at 38, is formed in the upper housing 18', formed in a structure integral to the edge 28 that is similar to the blade 24 described above. Second slot 38 is straight, rather the L shaped, and centered on the reference frame line Y, with a closed end 40, a pair of parallel straight edges 42 spaced apart by the diameter of shaft end 14, and an open end 44 that faces away from edge 28. As with the first slot 30, the closed end 40 is semi cylindrical, and the open end 44 is flared wider than the diameter of shaft end 14. The second slot's straight edges 42 are also at least as long as the diameter of shaft end 14. The closed end 40 has a clearance of at least Δ Y away from the nominal location of the circumference of shaft end 14, as well, or half the total tolerance range. The two slots 30 and 38 cooperate to retain and accommodate the shaft end 14 as described next.

Figure 7:
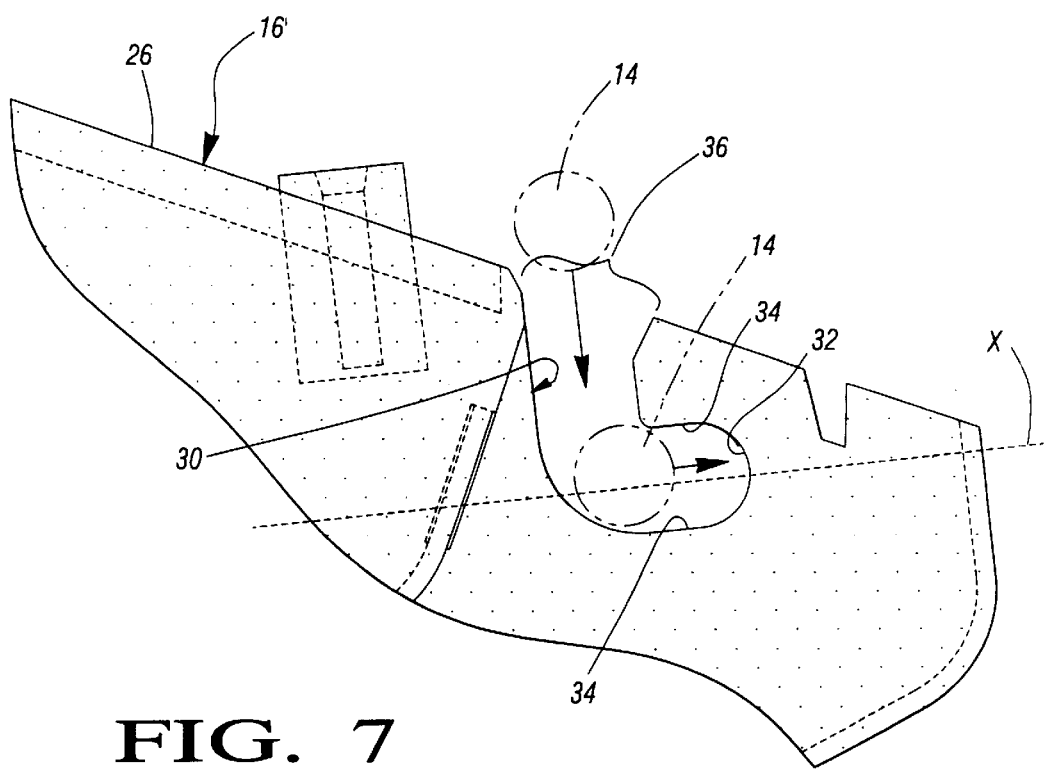
FIG. 7 is a view of the end of the shaft inserted in the first capture slot, before the two housings are assembled together.
Figure 8:
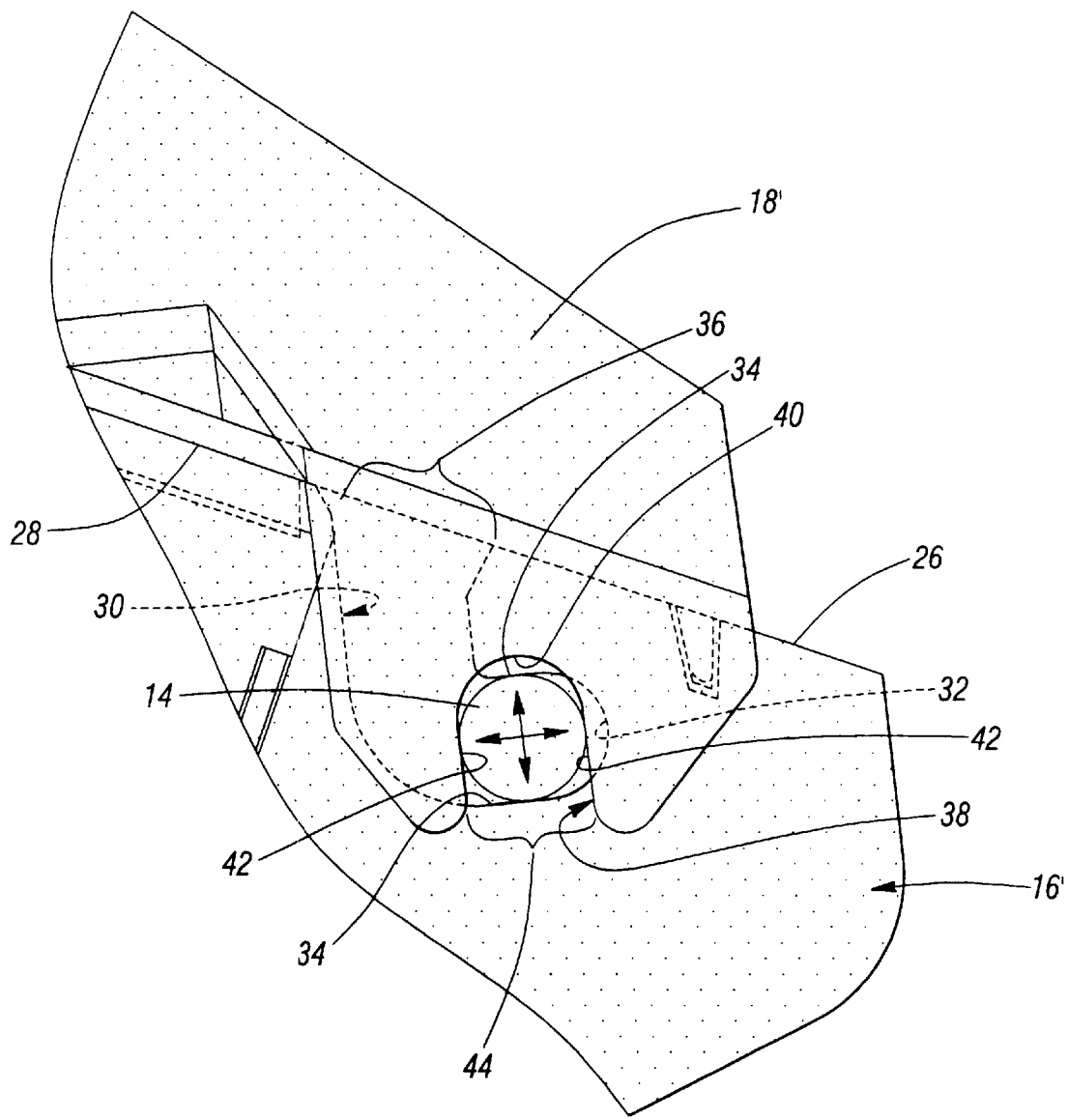
FIG. 8 is a view of the end of the shaft fully assembled, illustrating the accommodation of tolerance variations.

Referring next to FIGS. 7 and 8, valve 10 and the housings 16' and 18' are assembled by first inserting the non illustrated end of shaft 12 into a circular hole in lower housing 16', followed by inserting the illustrated cylindrical end 14 down into the first capture slot open end 36. Shaft end 14 is then pushed to the side between the straight edges 34, near or even against the closed end 32. Next, the upper housing 18' is moved toward the lower housing 16' in the direction Y until their respective edges 28 and 26 abut. Concurrently, the second capture slot's open end 44 moves past and crosses the first slot 30, moving over the shaft end 14. The open end 44 is flared widely enough to find and capture the shaft end 14 no matter where it rests along and between the straight edges 34. As the shaft end 14 moves between the second slot straight edges 42, all four "sides" of the shaft end 14 are tangentially contacted by the four slot straight edges 34 and 42, at four basically diametrically opposed points, as shown in FIG. 8. As the housing edges 26 and 28 move into abutment and the slots 30 and 38 settle out to their final positions, the shaft end 14 can "float" in any of the four directions shown by the four sided arrow in FIG. 8, within its expected tolerance range. Specifically, the shaft end 14 can float along the line X, staying in contact always with the straight edges 34, without binding on the first slot closed end 32, and without moving out of the open end 36. Likewise, the shaft end 14 can float along the line Y, remaining in contact with the straight edges 42, without binding on the second slot closed end 40 or moving out of the open end 44. The maintenance of continual four point contact with the edges of the slots 30 and 38 provides for well supported rotation of the shaft end 14, while the prevention of hard contact with either of the slots' closed ends 32 or 40 prevents interference with the full abutment of the housing edges 26 and 28.

Variations in the structure and method disclosed could be made within the spirit of the invention. The first slot 30 could be a simple straight slot, if it were cut through the end of the lower housing 16', rather than cut below the edge 26. The shaft end 14 could be inserted first into the upper housing straight slot 38, instead of the lower housing L shaped slot 30, if desired. As a practical matter, the shaft end 14 is likely to be installed first in whichever housing is beneath the other at the time of assembly. Or, the valve shaft 12 could be held in a fixture, and both slots 30 and 38 could move over the shaft end 14 simultaneously. In any event, the shaft end 14 will ultimately be closely captured between the two pairs of slot straight edges 34 and 42, and will be able to float freely to its final location as described. Therefore, it will be understood that it is not intended to limit the invention exactly to the particular embodiment disclosed.

I claim:

1. A method for assuring a close fitting, non binding, capture of a cylindrical shaft end between a pair of housings of an automotive heating and air conditioning case that are assembled by being moved into abutment along a predetermined direction, comprising the steps of:

determining a nominal assembled location for the circumference of said rotating shaft end relative to said housings, determining a first manufacturing tolerance range in the nominal location of said shaft end circumference oriented perpendicularly to said predetermined direction of assembly and a second manufacturing tolerance range oriented along said predetermined direction of assembly, providing a first capture slot in one of said housings oriented perpendicularly to the direction of assembly, said first capture slot having an open entry end, a closed end, and a pair of straight edges at least as long as the diameter of said shaft end and spaced apart by substantially the diameter of said shaft end, with the closed end of said first capture slot having a clearance from the nominal assembled location of the circumference said shaft end at least equal to half of said predetermined first tolerance range, providing a second capture slot in the other of said housings oriented along the direction of assembly, said second capture slot having an open entry end facing away from its respective housing edge, a closed end, and a pair of straight edges at least as long as the diameter of said shaft end and spaced apart by substantially the diameter of said shaft end, with the closed end of said second capture slot having a clearance from the nominal assembled location of the circumference of said shaft end at least equal to half of said predetermined second tolerance range, inserting said shaft end into one of said capture slots, and, moving said housings into abutment, thereby moving the other of said capture slots over said shaft end, after which said shaft end is tangentially contacted at two pairs of diametrically opposed points by said four slot straight edges, with manufacturing tolerance variations in the assembled location of said shaft end in either direction along said direction of assembly and in either direction perpendicular thereto being accommodated by the two open ends and of said capture slots and by the two slot closed end clearances, so that said shaft end is closely captured regardless of tolerance variations and without binding in said slots.

* * * * *